Sept. 1, 1942.  C. A. ABER  2,294,358
PECAN CRUSHING DEVICE
Filed July 11, 1941
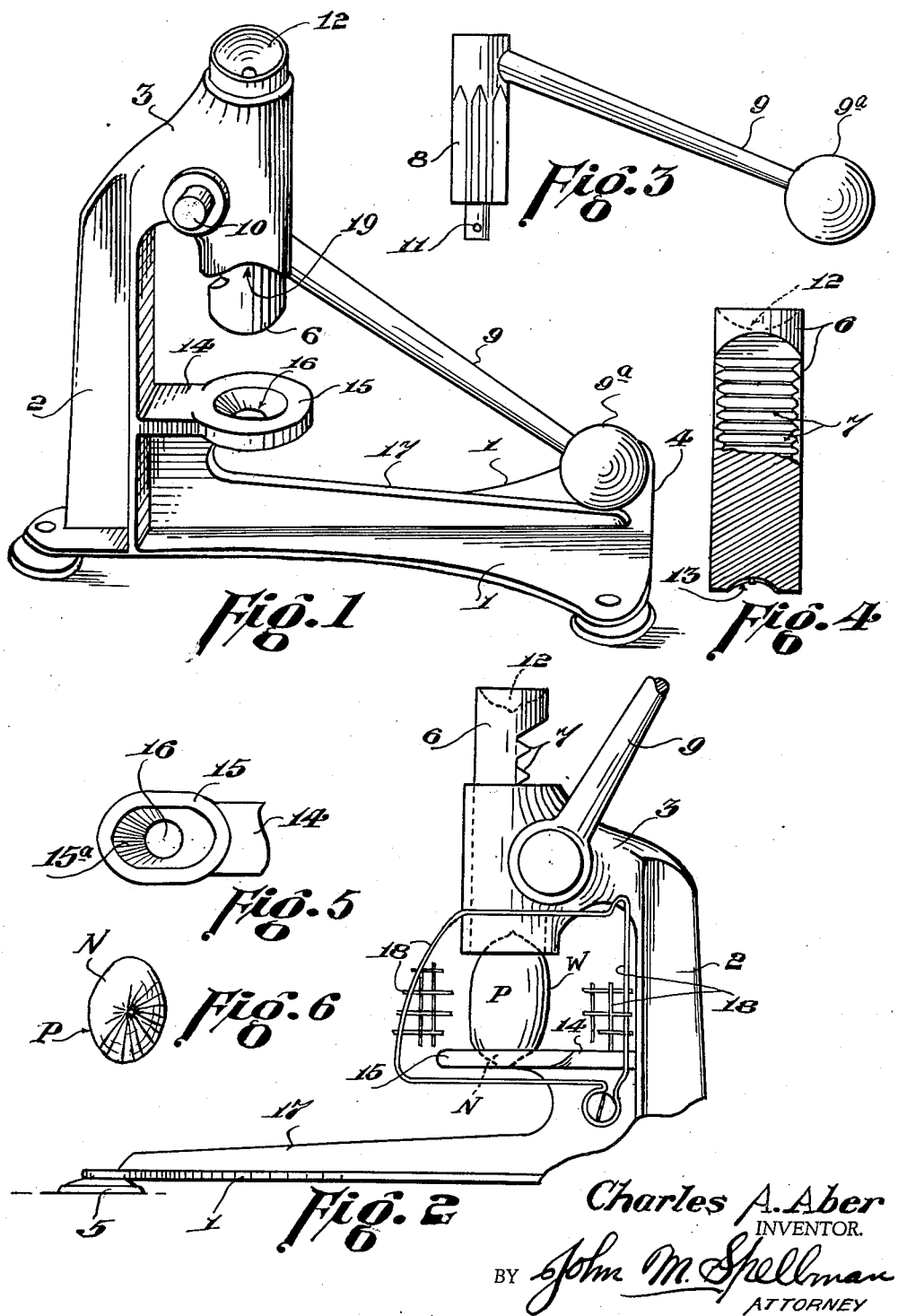
Charles A. Aber
INVENTOR.
BY John M. Spellman
ATTORNEY Patented Sept. 1, 1942

2,294,358

UNITED STATES PATENT OFFICE 2,294,358

PECAN CRUSHING DEVICE

Charles A. Aber, Marshall, Tex.

Application July 11, 1941, Serial No. 401,900

2 Claims. (Cl. 146—16)

This invention relates to nut crackers of a type operated by hand and in such connection it has more particular reference to a device for the cracking of pecans.

One of the objects of the invention is the provision of a pecan cracker designed to crack a pecan so that the meat or kernel will not be injured or crushed and which will crack or break the pecan shell in such a manner that the pecan meat may be removed in a whole condition.

Another important feature of this invention is the provision of a pecan cracker wherein the pressure applied by the device is brought to bear at the ends and side walls of a pecan and preventing the pressure from splitting the shell centrally of the pecan axis which action results in crushing the pecan kernel or meat.

The invention is also designed so that pecans of different sizes may be cracked and the pressure applied thereto by adjusting the cracking elements to accommodate the size of the pecan.

The improved pecan cracker may be readily understood from a perusal of the following detailed description taken in connection with the accompanying drawing, and in the drawing:

Figure 1 is a perspective view of the pecan cracker;

Figure 2 is a side elevational view taken from the side opposite to that shown in Figure 1, and partly broken away;

Figure 3 is a top plan view of the operating lever removed from the cracker;

Figure 4 is a face view, partly in section, of a toothed rack element which co-acts with the lever;

Figure 5 is a top plan view of the pecan seating and holding means; and

Figure 6 is an end view of a pecan, being that end which is seated in the pecan support to be operated upon by the lever.

In carrying out the invention there is provided a frame, cast in one piece, and which includes a supporting base 1, upright 2 and a head 3. The base extends outwardly from the upright 2 and is widened at the point 4 to facilitate a more firm position of the support upon a table or the like, and includes rubber or similar pads 5 to prevent slippage. No screws or fastening means are employed to hold the pecan cracker in position. Provision is made for use of fastening screws if desired by hole bored through rivets 5—a of Fig. 1.

The head 3 is hollow for the purpose of admitting the toothed element 6, provided with the teeth 7. The element 7 may be removed entirely from the cracker when desired and is adapted to coact with an elongated gear 8, formed integrally by preference with the operating lever 9. The head 3 is bored at right angles to the walls thereof and across the hollow interior so that the gear may be received therein and held in position by the stub shaft 10, in connection with a small spring-pressed ball 11.

The ends of the toothed rack element 6 are cup or somewhat cone-shaped, for instance in Figure 1 the upper end of the element 6 has a depression 12 and the lower end a similar depression or cavity 13, see Figure 4. This construction is for the purpose of accommodating different size pecans, also the length of pecans is provided for by the ability as exemplified in the construction of the device for the adjustment of the engagement of the gear 8 and the toothed element 6. The element 6 can be placed higher or lower in the head 3 by removing the lever with its gear 8.

Spaced below the lower end of the element 6 and the head 3 is a pecan support or shelf 14 terminating in an oval shaped pecan holding element 15, having an opening 16 to receive the nose or lower end of a pecan P. The opposite end of the pecan, which is ordinarily more rounded, is placed in one of the cup-shaped depressions or cavities 12 or 13 depending upon the dimensions or shape of the pecan.

Particular attention is called to the shape of the pecan holding means as depicted in the holding element 15. It will be noted that the element 15 is substantially oval in top plan view to accommodate the nose N of the pecan which is seated in the opening 16, and also that the walls 15—a are inwardly sloped. This serves to hold the pecan more readily. The shelf 14 is formed integrally with a tongue or rib 17, made integrally with the base 1. An apron or deflecting means is shown in broken formation in Figure 2 at 18 for preventing the pecan shells from scattering, and the lower end of the head 3 at 19 is cut away to more readily admit the pecan.

In the operation of the pecan cracker, the lever 9 is raised to a position sufficient to elevate the element 6 for receiving the pecan and then the lever is brought downwardly to the position shown in Figure 1, and the handle owing to its angular relation with the gear 8, see Figure 3, the ball or knob 9—a rests upon the rib or tongue 17 which is the end of the lever stroke. Special attention is also called to the fact that the cup-shaped depressions 12 and 13 will, according to the size of the pecan, first crush the extreme ends of the latter. The walls of the cup-shaped cavities or depressions, however, overhang the body of the pecan, and when the pressure has crushed the extreme ends of the pecan, a continued downward movement of the lever 9 brings a pressure on the walls of the shell at W, causing them to buckle and crack. The pressure is applied until the cracking or breaking sound has ceased, which indicates that the pecan has been sufficiently cracked and the shell broken into such condition that it may be removed. Upon removal it will be found that the shell may be readily and easily removed by the fingers, leaving the kernel or meat in a whole and unbroken condition.

While the disclosure presents a practical working embodiment of the invention as adapted to a manually operated device, it is obvious that, in accordance with the principle of construction and operation, changes, alterations and modifications may be made therein, which would be within the range and scope of the following claims.

What is claimed is:

1. A nut cracking device, comprising a unitary frame member having an elongated base adapted to rest upon a substantially horizontal surface, an integral upright post projecting upwardly from one end of the base while a substantial portion of the base extends outwardly beyond the head and to both sides thereof to give stability to the device, an integral hollow cylindrical head projecting laterally from said post partially over the base, and a horizontal shelf projecting from said post beneath said head and spaced from the head and from the base, said shelf having a cuplike nut receiving cavity therein with a central aperture in alignment with the vertical axis of said cylindrical head; a reciprocable plunger detachably mounted in said head and reversible end for end, said plunger having cavities of different sizes in opposite ends thereof adapted to accommodate nuts of different sizes, and means for actuating said plunger to and fro with reference to said base.

2. A nut cracking device comprising a unitary frame member, including an elongated triangular base portion adapted to rest upon a flat horizontal surface, an integral post projecting upwardly from one corner of the base and having a substantially cylindrical hollow head portion overhanging the base while a substantial portion of the base extends outwardly beyond the head portion to give stability to the device, a central longitudinal rib integral with said base extending from said post toward the opposite end of the base and intersecting the central vertical axis of said head portion, said rib having an inner portion integral with said post and extending substantially above the level of the outer portion of the rib and above said base, and a horizontal shelf integral with said upright and resting upon the elevated portion of said rib, said shelf having a nut receiving depression directly beneath the center of said hollow head; a reversible plunger mounted for reciprocation within said hollow head, having a cuplike cavity in each end adapted to accommodate nuts of different sizes, and means for reciprocating said plunger, said means including a detachable gear member rotatably mounted on a horizontal axis in said head in cooperative relation to said plunger, and a handle for actuating said gear member, the end of said handle when lowered in the inoperative position of said device being adapted to rest on the top of the outer portion of the central rib on said base.

CHARLES A. ABER.